(12) United States Patent
Rong et al.

(10) Patent No.: US 11,772,559 B2
(45) Date of Patent: Oct. 3, 2023

(54) REARVIEW MIRROR AND VEHICLE

(71) Applicant: Yuanfeng Technology Co., Ltd., Dongguan (CN)

(72) Inventors: Haifeng Rong, Guangdong (CN); Libing Yu, Guangdong (CN); Zhilong Xiong, Guangdong (CN)

(73) Assignee: YUANFENG TECHNOLOGY CO., LTD., Dongguan (CN)

( * ) Notice: Subject to any disclaimer, the term of this patent is extended or adjusted under 35 U.S.C. 154(b) by 156 days.

(21) Appl. No.: 17/004,346

(22) Filed: Aug. 27, 2020

(65) Prior Publication Data

US 2020/0398758 A1 Dec. 24, 2020

(30) Foreign Application Priority Data

Aug. 30, 2019 (CN) .......................... 201921442057.1

(51) Int. Cl.
*B60R 1/12* (2006.01)
*G02B 5/30* (2006.01)
*B60R 1/04* (2006.01)

(52) U.S. Cl.
CPC ................. *B60R 1/12* (2013.01); *B60R 1/04* (2013.01); *G02B 5/3025* (2013.01); *B60R 2001/1253* (2013.01)

(58) Field of Classification Search
CPC ..... B60R 1/12; B60R 1/04; B60R 2001/1253; G02B 5/3025
USPC .......................................................... 359/485
See application file for complete search history.

(56) References Cited

U.S. PATENT DOCUMENTS

| 2009/0142517 A1* | 6/2009 | Takeko .................... G02B 1/14 428/1.31 |
| 2009/0296023 A1* | 12/2009 | Lee ....................... G02B 5/0242 349/64 |
| 2011/0141381 A1* | 6/2011 | Minikey, Jr. .............. B60R 1/12 349/11 |

* cited by examiner

*Primary Examiner* — Balram T Parbadia
*Assistant Examiner* — Rahman Abdur
(74) *Attorney, Agent, or Firm* — SHIMOKAJI IP

(57) ABSTRACT

A rearview mirror includes a shell with an opening, a display light-emitting structure installed in the shell, a protective structure and a reflective polarizing structure installed at the opening. The reflective polarizing structure is a single layer made of both reflective material and polarizing material, the protective structure comprises an outer glass layer, the outer glass layer, the reflective polarizing structure, and the display light-emitting structure are laminated in sequence, and the reflective polarizing structure is attached to one of the outer glass layer and the display light-emitting structure. The rearview mirror has a simple structure, less light loss, and good display quality.

4 Claims, 4 Drawing Sheets

REARVIEW MIRROR AND VEHICLE

FIELD OF THE INVENTION

The present invention relates to rearview mirrors of a vehicle, and more particularly to a rearview mirror with simple structure, less light loss and good display quality, and a vehicle with such a rearview mirror.

BACKGROUND OF THE INVENTION

With the development of the automobile industry, people require automobile products such as rearview mirrors to have better safety and comfort. Existing rearview mirrors of a vehicle usually require a display screen structure to facilitate viewing, and the surface of the display screen structure is required to be reflective. In order to meet the demands, at this stage, a surface reflection structure is usually added on the display screen structure, and the surface reflection structure and the display screen structure are laminated and combined to achieve light reflection and screen display functions. Because the surface reflective structure often is required to include multilayer structures having a protective glass, a reflective material layer, and an intermediate connection layer, and the display screen structure also includes multilayer structures having a polarizer, a display and light-emitting structure, and an intermediate connection layer. The light source emitted from the display screen needs to pass through the above-mentioned multi-layer materials, and the loss of the light source of the display screen is large, which leads to the low brightness of the display screen; moreover, the display quality will also be greater varied and distorted due to the characteristics of each layer material, which leads a poor display quality on the display screen.

Therefore, there is an urgent need to provide a rearview mirror with a simple structure, less light loss, and good display quality to solve the above problems.

SUMMARY OF THE INVENTION

One objective of the present invention is to provide a rearview mirror with a simple structure, less light loss, and good display quality.

Another objective of the present invention is to provide a vehicle having rearview mirror with a simple structure, less light loss, and good display quality.

To achieve the mentioned above objectives, the present invention provides a rearview mirror including a shell with an opening, a display light-emitting structure installed in the shell, a protective structure and a reflective polarizing structure installed at the opening. Wherein the reflective polarizing structure is a single layer made of both reflective material and polarizing material, the protective structure comprises an outer glass layer, the outer glass layer, the reflective polarizing structure, and the display light-emitting structure are laminated in sequence, and the reflective polarizing structure is attached to one of the outer glass layer and the display light-emitting structure.

As an embodiment, the reflective polarizing structure is attached to the display light-emitting structure.

Preferably, the rearview mirror further includes an adhesive layer located between the reflective polarizing structure and the display light-emitting structure, whereby the reflective polarizing structure and the display light-emitting structure are adhered to each other.

As another embodiment, the reflective polarizing structure is attached to the outer glass layer.

Preferably, the rearview mirror further includes an adhesive layer located between the outer glass layer and the reflective polarizing structure, whereby the outer glass layer and the reflective polarizing structure are adhered to each other.

As one more embodiment, the protective layer further comprises an inner glass layer, the reflective polarizing structure is located between the outer glass layer and the inner glass layer, and the outer glass layer, the reflective polarizing structure and the inner glass layer are adhered in sequence.

Preferably, the rearview mirror further includes a first adhesive layer by which the outer glass layer is adhered to the reflective polarizing structure, and a second adhesive layer by which the reflective polarizing structure is adhered to the inner glass layer.

Accordingly, the present invention further includes a vehicle including a vehicle body and at least one rearview mirror mentioned above and mounted on the vehicle body.

In comparison with the prior art that a surface reflective layer is directly added on the display screen, the rearview mirror of the present invention uses a reflective polarizing structure that is a single layer made of both reflective material and polarizing material, and the reflective polarizing structure is adhered to the outer glass layer or the display light-emitting structure to form a whole, thus less layers are stacked in the mirror, the thickness of the layers and the gaps among the layers are reduced, thereby reducing the whole thickness and weight of the mirror, and reducing the manufacturing cost. Meanwhile, due to the reduction of the layer structure, light propagation path of the light from the display screen is shortened, thereby reducing the loss of the display light source, and increasing the brightness of the display screen. In addition, layers in the rearview mirror are reduced to simplify the structure, which can reduce the loss and distortion of the light source emitted by the display light-emitting structure, thereby improving the display quality and brightness of the rearview mirror. Furthermore, the reflective polarizing structure is adhered to the outer glass layer or the display light-emitting structure to form a whole, which simplifies the installation of the rearview mirror.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
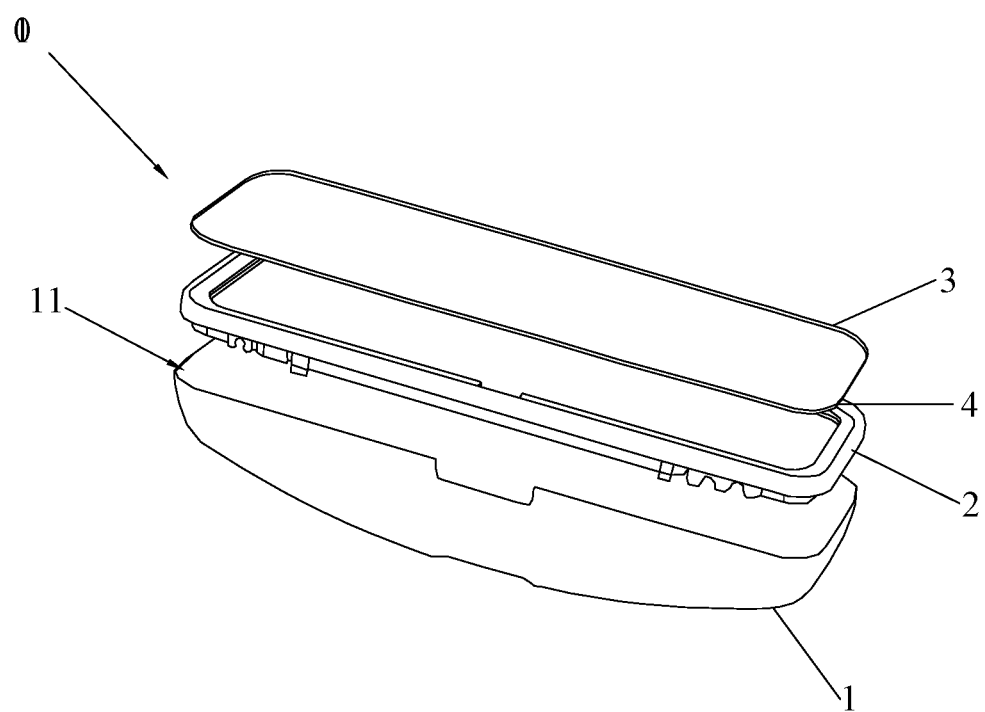
FIG. 1 is an exploded perspective view of a rearview mirror according to an embodiment of the present invention.

The present invention will be described in detail below with reference to the accompanying drawings and preferred embodiments.

The present invention provides a vehicle (not shown) including a vehicle body (not shown) and at least one rearview mirror 100 installed on the vehicle body, by means of the rearview mirror 100, the comfort and safety of driving the vehicle are improved. Specifically, the rearview mirror 100 includes a shell 1 with an opening 11, a display light-emitting structure 2 installed in the shell 1, a protective structure 3 installed at the opening 11, and a reflective polarizing structure 4. More specifically, the reflective polarizing structure 4 is a single layer made of both a reflective material and a polarizing material. The protective structure 3 includes an outer glass layer 31, the outer glass layer 31, the reflective polarizing structure 4, and the display light-emitting structure 2 are laminated in sequence, and the reflective polarizing structure 4 is attached to one of the outer glass layer 31 and the display light-emitting structure 2 to form an integrate. The light source emitted by the display light-emitting structure 2 first enters into the reflective polarizing structure 4, then is reflected to the protective structure 3, and finally reaches the human eye. Specifically, the polarizing material of the reflective polarizing structure 4 can selectively increase the transmittance of the light source according to the polarization direction of the light source emitted by the display light-emitting structure 2. When the display light-emitting structure 2 is not displayed, the brightness of the light outside the rearview mirror 100 is relatively strong, the reflective material of the reflective polarization structure 4 can enhance the reflection of the external light source, so that the driver can know the situation of the rear side of the vehicle body through the rearview mirror 100. Hereinafter, the rearview mirror 100 of the present invention will be described in detail with reference to FIGS. 1 to 4.

Embodiment 1

Figure 2:
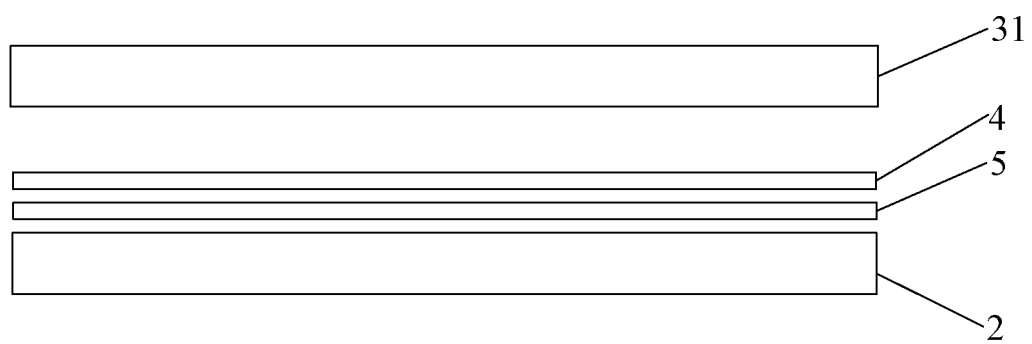
FIG. 2 is a schematic view of a rearview mirror according to a first embodiment of the present invention, showing a display light-emitting structure, a protective structure, and a reflective polarizing structure.

Referring to FIGS. 1 and 2, in this embodiment, the reflective polarizing structure 4 is adhered to the display light-emitting structure 2. Specifically, the protective layer includes an outer glass layer 31. The outer glass layer 31 and the reflective polarizing structure 4 are independent, while the reflective polarizing structure 4 and the display light-emitting structure 2 are attached together as an integrated body. The reflective polarizing structure 4 and the display light-emitting structure 2 as a whole is installed in the shell 1, and the protective structure 3 is installed at the opening 11 of the shell 1. The light source emitted by the display light-emitting structure 2 first enters into the reflective polarizing structure 4, then is reflected to the protective structure 3, and finally reaches the human eye. By this token, intermediate layers between the light-emitting structure 2 and the outer glass layer 31 are reduced to simplify the structure, which reduces the loss and distortion of the light source emitted by the display light-emitting structure 2, thereby improving the display quality and brightness of the rearview mirror 100.

Specifically, in this embodiment, the rearview mirror 100 further includes an adhesive layer 5 located between the reflective polarizing structure 4 and the display light-emitting structure 2, so as to adhere the reflective polarizing structure 4 to the display light-emitting structure 2 to form an integrate. Comparing with the manner in which the reflective polarizing structure 4 and the display light emitting structure 2 are connected through other connecting structures, the present configuration in this embodiment can reduce the bonding gap between the reflective polarizing structure 4 and the display light-emitting structure 2, and facilitate the realization of the light and thin design to the view mirror 100, furthermore simplify the processing of the rear view mirror 100.

Embodiment 2

Figure 3:
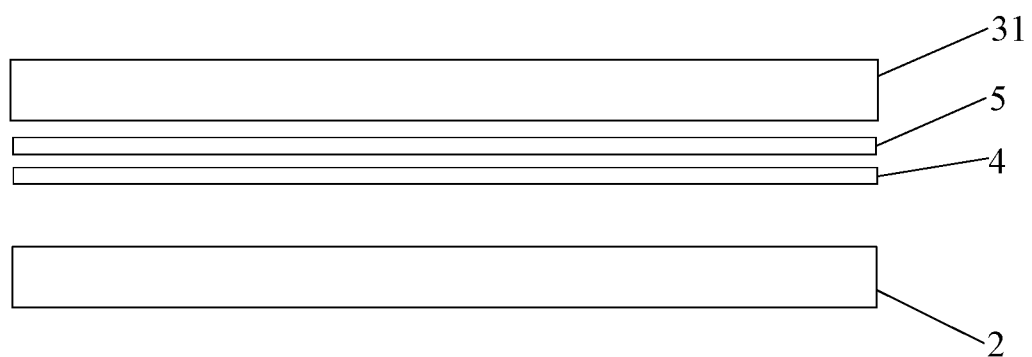
FIG. 3 is a schematic view of a rearview mirror according to a second embodiment of the present invention, showing a display light-emitting structure, a protective structure, and a reflective polarizing structure.

Referring to FIGS. 1 and 3, in this embodiment, the reflective polarizing structure 4 is attached to the outer glass layer 31. Specifically, the protective structure 3 includes an outer glass layer 31. The outer glass layer 31 and the reflective polarizing structure 4 are adhered together as an integrated body, while the reflective polarizing structure 4 and the display light-emitting structure 2 are independent. The display light-emitting structure 2 is installed in the shell 1, and the reflective polarizing structure 4 and the outer glass layer 31 adhered together as a whole are installed at the opening 11 of the shell 1. The light source emitted by the display light-emitting structure 2 first enters into the reflective polarizing structure 4, then is reflected to the protective structure 3, and finally reaches the human eye. By this token, intermediate layers between the light-emitting structure 2 and the outer glass layer 31 are reduced to simplify the structure, which reduces the loss and distortion of the light source emitted by the display light-emitting structure 2, thereby improving the display quality and brightness of the rearview mirror 100.

Specifically, in this embodiment, the rearview mirror 100 further includes an adhesive layer 5 located between the outer glass layer 31 and the reflective polarizing structure 4, so as to adhere the outer glass layer 31 to the reflective polarizing structure 4. Comparing with the manner in which the reflective polarizing structure 4 and the outer glass layer 31 are connected through other connecting structures, the present configuration in this embodiment can reduce the bonding gap between the reflective polarizing structure 4 and the outer glass layer 31, and facilitate the realization of the light and thin design to the view mirror 100, furthermore simplify the processing of the rear view mirror 100 accordingly.

Embodiment 3

Figure 4:
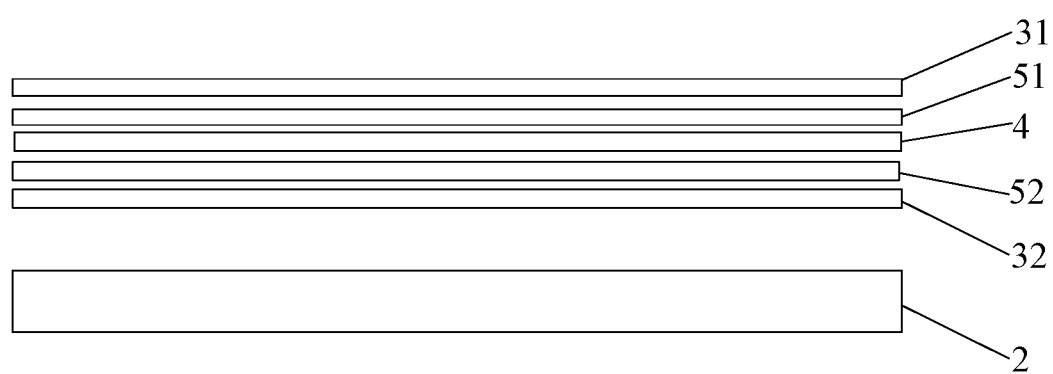
FIG. 4 is a schematic view of a rearview mirror according to one embodiment of the present invention, showing a display light-emitting structure, a protective structure, and a reflective polarizing structure.

Referring to FIGS. 1 and 4, in this embodiment, the protective structure 3 includes a outer glass layer 31 and an inner glass layer 32, the reflective polarizing structure 4 is located between the outer glass layer 31 and the an inner glass layer 32, and the outer glass layer 31, the reflective polarizing structure 4 and the inner glass layer 32 are adhered together as an integrated body. In this embodiment, both sides of the reflective polarizing structure 4 are attached with a glass layer respectively, which may protect and support the reflective polarizing structure 4 under the cooperation of the outer glass layer 31 and the inner glass layer 32. In order to reduce the overall thickness of the rearview mirror 100, in this embodiment, the outer glass layer 31 and the inner glass layer 32 are designed to be light and thin. Furthermore, as the thickness of the outer glass layer 31 is thin, glass particles generated from the damaged outer glass layer 31 will be absorbed due to the adsorption effect of the adhesive structure. Layers between the display light-emitting structure 2 and the outer glass layer 31 are still reduced due to the single layer of the reflective polarizing structure 4. By this token, intermediate layers in the rearview mirror 100 are reduced to simplify the structure, which can reduce the loss and distortion of the light source emitted by the display light-emitting structure 2, thereby improving the display quality and brightness of the rearview mirror 100.

Specifically, in this embodiment, the rearview mirror 100 further includes a first adhesive layer 51 located between the outer glass layer 31 and the reflective polarizing structure 4, and a second adhesive layer 52 located between the reflective polarizing structure 4 and the inner glass layer 32. By means of first adhesive layer 51 and the second adhesive layer 52, the outer glass layer 31, the reflective polarizing structure 4, and the second adhesive layer 32 are adhered in turns, to form a whole. Comparing with the manner in which the reflective polarizing structure 4 and the outer glass layer 31 are connected through other connecting structures, the present configuration in this embodiment can reduce the bonding gap among the outer glass layer 31, the reflective polarizing structure 4 and the outer glass layer 31, and facilitate the realization of the light and thin design to the rearview mirror 100, furthermore simplify the processing of the rear view mirror 100 accordingly.

In comparison with the prior art that a surface reflective layer is directly added on the display screen, the rearview mirror 100 of the present invention uses a reflective polarizing structure 4 that is a single layer made of both reflective material and polarizing material, and the reflective polarizing structure 4 is adhered to the outer glass layer 31 or the display light-emitting structure 2 to form a whole, thus less layers are stacked in the mirror 100, the thickness of the layers and the gaps among the layers are reduced, thereby reducing the whole thickness and weight of the mirror 100, and reducing the manufacturing cost. Meanwhile, due to the reduction of the layer structure, light propagation path of the light from the display screen is shortened, thereby reducing the loss of the display light source, and increasing the brightness of the display screen. In addition, layers in the rearview mirror 100 are reduced to simplify the structure, which can reduce the loss and distortion of the light source emitted by the display light-emitting structure 2, thereby improving the display quality and brightness of the rearview mirror 100. Furthermore, the reflective polarizing structure 4 is adhered to the outer glass layer 31 or the display light-emitting structure 2 to form a whole, which simplifies the installation of the rearview mirror 100.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A rearview mirror comprising a shell with an opening, a display light-emitting structure installed in the shell, a protective structure and a reflective polarizing structure installed at the opening, wherein the reflective polarizing structure is a single layer made of both reflective material and polarizing material, the protective structure comprises an outer glass layer and an inner glass layer, the outer glass layer, the reflective polarizing structure, the inner glass layer, and the display light-emitting structure are laminated in sequence, the reflective polarizing structure is located between the outer glass layer and the inner glass layer, and the outer glass layer, the reflective polarizing structure and the inner glass layer are adhered in sequence to form an integral structure, the outer glass layer is an outermost layer that is towards a viewer, the reflective polarizing structure is attached to the outer glass layer only by a first adhesive layer sandwiched therebetween, and the reflective polarizing structure is directly bonded with the first adhesive layer without any intermediate layer.

2. The rearview mirror according to claim 1, further comprising an adhesive layer located between the outer glass layer and the reflective polarizing structure, whereby the outer glass layer and the reflective polarizing structure are adhered to each other.

3. The rearview mirror according to claim 1, further comprising a second adhesive layer by which the reflective polarizing structure is adhered to the inner glass layer.

4. A vehicle, comprising a vehicle body and at least one rearview mirror mounted on the vehicle body, wherein the rearview mirror is claimed as in claim 1.

* * * * *